C. H. BARD.
ADJUSTABLE TELEPHONE INSTRUMENT LOCKING DEVICE.
APPLICATION FILED OCT. 28, 1911.
1,042,188.
Patented Oct. 22, 1912.
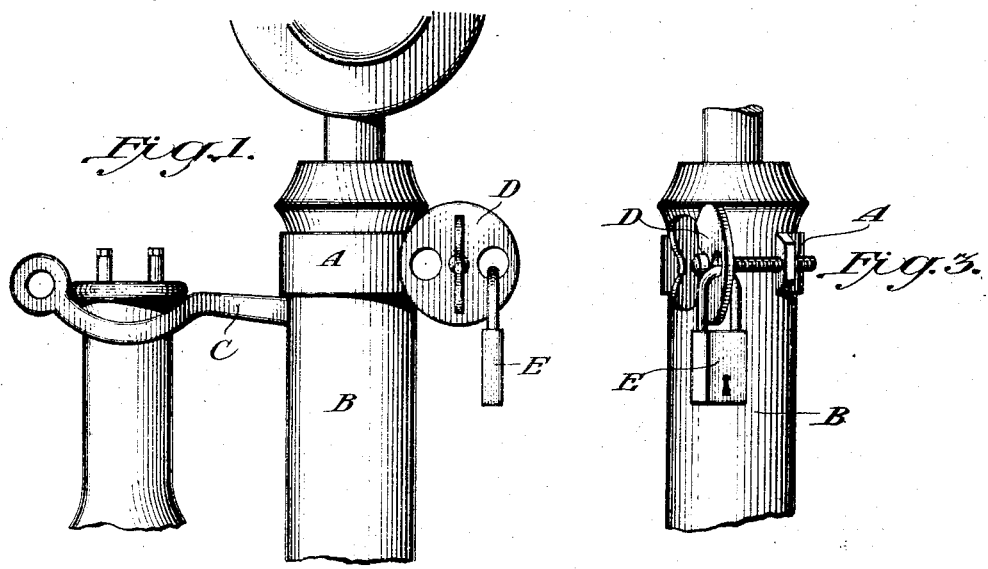
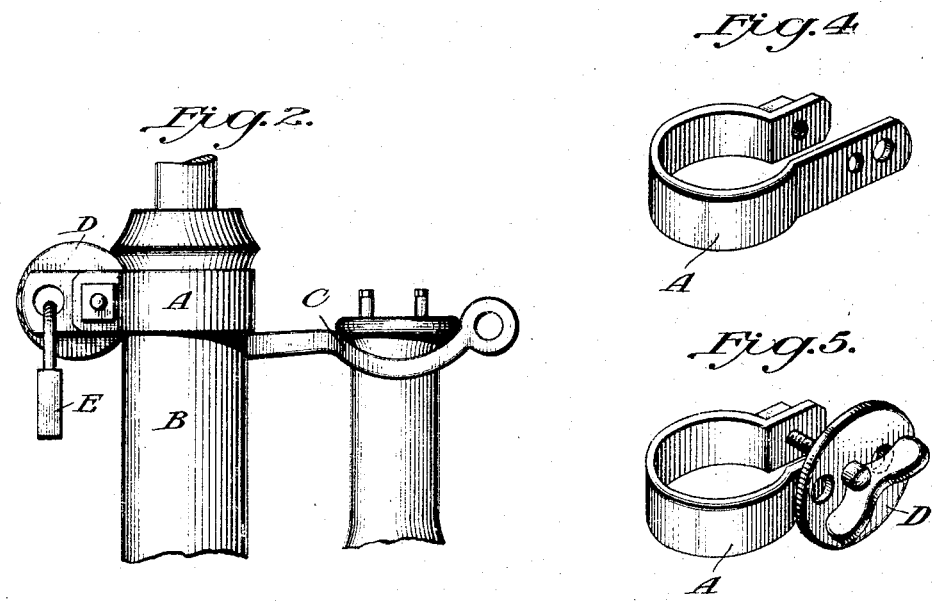
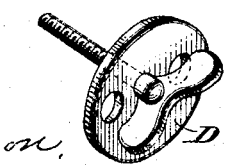

UNITED STATES PATENT OFFICE.

CHARLES H. BARD, OF MOUNT VERNON, NEW YORK.

ADJUSTABLE TELEPHONE-INSTRUMENT-LOCKING DEVICE.

1,042,188. Specification of Letters Patent. Patented Oct. 22, 1912.

Application filed October 28, 1911. Serial No. 657,273.

*To all whom it may concern:*

Be it known that I, CHARLES H. BARD, a citizen of the United States, residing at Mount Vernon, in the county of Westchester and State of New York, have invented a new and useful Adjustable Telephone-Instrument-Locking Device, of which the following is a specification.

My invention relates to improvements in the method of locking a telephone instrument, the object being to absolutely lock the instrument, preventing its use. I attain this object by the mechanism illustrated in the accompanying drawings.

Figure 1 is an outline drawing of a portion of a telephone instrument with the adjustable locking device in proper position showing the instrument locked. Fig. 2 is a similar drawing showing opposite view to that shown in Fig. 1. Fig. 3 is a view showing device in position and method of adjusting same. Fig. 4 is a view showing the band portion of the invention with short flange on one end to which is attached a nut also showing on the other end a larger flange or lip in which will be noticed two holes, one small for the bolt and the other large at the extreme end known as the lock hole. Fig. 5 is a view showing the band portion of the invention with washer head thumb bolt in position with two large holes in washer which are also known as lock holes. Fig. 6 is a view of the washer head thumb bolt which is specially designed with a large washer attached, made in one piece, threaded from extreme end to washer.

Similar letters refer to similar parts throughout the several views.

The band A as shown in Fig. 1 is placed about the column B of the instrument above the receiver arm C then the washer head thumb bolt D is inserted through the small bolt hole in the large flange or lip of band A as shown in Fig. 4 the end of the said bolt passing through this hole and also through a similar hole in the flange on the opposite end of the band A threading its way into the nut attached to the opposite side thereof as shown in Fig. 3.

The adjustment portion of this invention is attained by the operation of the washer head thumb bolt D when in position as above described. By tightening the washer head thumb bolt D the band A is brought to any tension desired as the diameter of band A is made smaller than that of column B as shown in Fig. 3. For locking the instrument the washer head thumb bolt D is adjusted to a point where it is found that the receiver arm C cannot be moved, thus locking the instrument by preventing the receiver arm C from moving either outward or upward and opening the instrument when the receiver is removed.

In the washer head thumb bolt D there are two large holes known as lock holes, these holes are situated on opposite sides of the washer being exactly the same size as the large hole in the large flange of band A above referred to being so constructed that the length of the large flange on band A is about the same size as the diameter of the washer portion of the washer head thumb bolt D so that when the washer head thumb bolt D is in position on band A, these holes will come opposite each other by the operation of the washer head thumb bolt D and as there is a lock hole on each side of the washer portion of the bolt D there is attained an opportunity to lock the device at every half turn of the washer head thumb bolt D as shown in Fig. 1.

The large diameter of the washer head on thumb bolt D and the large flange on band A serve two purposes. 1. This design brings the lock holes of band A and bolt D out beyond the nut flange end of band A when in position on the instrument thus offering easy access for inserting lock as shown in Fig 2. 2. By designing washer head thumb bolt D of large diameter and large flange on band A, large lock holes are obtained thus permitting the use of a fair size substantial lock. The nut end of band A and the washer head of bolt D also serve the purpose of bracing the flange ends of band A when in position on the instrument under tension as shown in Fig. 2.

The method to be employed in locking band A and bolt D together is by using a substantial pad lock such as is shown marked E in Figs. 1, 2, and 3. The device is unlocked by removing the lock and loosening bolt D, thus allowing room within band A for receiver arm C to move freely.

The device can remain on the instrument at all times either locked in a closed or open position by the operation of bolt D.

The band A is made of suitable metal such as spring brass with nut attached, lined on inside with felt to protect instrument. The washer head thumb bolt D is made of one piece of brass or other suitable metal.

I claim,

In a locking device for a telephone the combination with a telephone standard provided with a switchhook of a flexible annular band surrounding the column in a position to prevent movement of the switchhook, a thumb screw for connecting the ends of the band by holes through said ends, another hole in one end of the band, a washer head on he thumb screw with a plurality of holes through the washer head adapted to be brought into register with the hole in the end of the band and locking means passing through said registering openings.

CHARLES H. BARD.

Witnesses:
WILLIAM M. ANDERSON,
JESSE E. HOLDREDGE.

Copies of this patent may be obtained for five cents each, by addressing the "Commissioner of Patents, Washington, D. C."